United States Patent [19]

Broughton et al.

[11] Patent Number: 5,131,016
[45] Date of Patent: Jul. 14, 1992

[54] COMMUNICATIONS NETWORK DATA COMPRESSION CONTROL SYSTEM AND METHOD

[75] Inventors: John C. Broughton, Raleigh, N.C.; Robert S. Cahn, Carmel, N.Y.; James P. Gray, Chapel Hill; John P. O'Donnell, Cary, both of N.C.

[73] Assignee: International Business Machines Corporation, Armonk, N.Y.

[21] Appl. No.: 638,928

[22] Filed: Jan. 9, 1991

[51] Int. Cl.[5] .................. H04B 1/66; H04J 15/00
[52] U.S. Cl. ................................ 375/122; 370/54; 370/60; 370/118; 333/14; 340/826; 379/221; 379/273
[58] Field of Search ............... 375/122, 121; 370/17, 370/53, 54, 60, 79, 94.1, 118; 455/72; 333/14; 178/4.1 C; 382/56; 340/825.03, 826, 827; 379/219, 221, 271, 272, 273, 220

[56] References Cited

U.S. PATENT DOCUMENTS

| | | | |
|---|---|---|---|
| 4,679,187 | 7/1987 | Irvin | 370/17 |
| 4,823,342 | 4/1989 | Morita et al. | 370/79 |
| 4,890,282 | 12/1989 | Lambert et al. | 370/118 |
| 4,899,147 | 2/1990 | Schiaro et al. | 375/122 |

Primary Examiner—Benedict V. Safourek
Assistant Examiner—Young Tse
Attorney, Agent, or Firm—Edward H. Duffield

[57] ABSTRACT

Data communication nodes in a network comprising a plurality of nodes linked together to form communication paths negotiate by passing messages to identify to one another the maximum supportable degree of data compression capability. Logical comparisons are made at each node between indications received from upstream and downstream nodes, if any, regarding their own or their received indications of data compression capability with the present node's own degree of compression capability. This enables logical decisions to be made to suport the maximum degree of compression capability over each link or portion of a link between terminal nodes which define the ends of the overall link, thus improving data transmission by providing the highest degree of supportable compression over the longest path length.

12 Claims, 4 Drawing Sheets

FIG. 5.

| TH | RH (CI = OFF) | SNA UNCOMPRESSED DATA |

| TH | RH (CI = ON) | SNA COMPRESSION HEADER CAPABILITY = X | SNA COMPRESSED DATA |

CAPABILITY "X" RANGES: 0-3

COMMUNICATIONS NETWORK DATA COMPRESSION CONTROL SYSTEM AND METHOD

FIELD OF THE INVENTION

This invention relates generally to data communication systems and networks and specifically to methods of coordinating data compression processes over communication links in the network established between two or more communicating stations or nodes.

PRIOR ART

Data compression techniques are numerous, as papers by Ziv and Lempel entitled "A Universal Algorithm for Sequential Data Compression" appearing in IEEE Transactions on Information Theory, Volume 23, Number 3, pages 337–343, 1977 or another paper by the same authors entitled "Compression of Individual Sequences via Variable Rate Coding" appearing in the same journal, Volume 24, Number 5, pages 530–536, 1978, will attest. As such, the particular compression technique employed and the method of implementing compression is not the subject of this invention; however, the methods of compression that are described in the noted prior art and in a variety of patents on the subject are all applicable for use in the present invention.

Compression over communication links between two stations is commonly employed to increase the speed of transmission and to reduce the effective cost of the communication network charges, i.e. the time for transmission of a message. For example, many modems use compression on the data communication link tying the modems together. If the two modems are to compress data over the link connecting them, then it must be agreed in advance exactly what form of compression algorithm is to be used. This is easily provided if the modems themselves come from the same manufacturer and are preset to provide a uniform compression or decompression on all data passing through them. But compression coordination in a network constructed of elements from many diverse manufacturers is not so easily coordinated.

However, in modern communication networks for data, numerous links exist (as do numerous suppliers for the elements thereof) and a plurality of individual receptions and retransmissions may be necessary. If a given route between a sending data terminal equipment (DTE) and a receiving data terminal equipment (DTE) comprises two link segments, each operating with the same data compression algorithm, then the data will be compressed and transmitted over the first link, received, decompressed, recompressed for transmission at the output of the link into the input of the second portion of the link, and so forth. Thus, for a route between two DTE's, the route comprising two communication links tied together, data will be compressed and decompressed twice while traversing the route. Of course, if more links are involved, more compression and decompression will be involved. This is extremely time consuming and costly as well as unwarranted.

OBJECTS OF THE INVENTION

In view of the known difficulties with the prior art data compression and decompression techniques as applied to multilink communication routes, it is an object of the present invention to provide a technique for coordinating the adoption of compression and decompression modes of operation at each node at the time a communication route is established, i.e. when a communicating session is begun. This will eliminate the intermediate decompression and compression occurring at a plurality of network nodes handling the communication.

It is yet another object of the present invention to provide an improved compression mode capability arbitration and selection process to be conducted by the communicating nodes.

Yet another object of the present invention is to provide an improved communication apparatus and a system utilizing a compression negotiation apparatus and method for establishing the optimal degree of compression over one or more links in the communicating network.

BRIEF SUMMARY OF THE INVENTION

The present invention is realized in a preferred embodiment in which the data communication nodes in a given communications route between a primary terminal (or Primary Logical Unit "PLU") desiring to send data to a target terminal (a Secondary Logical Unit "SLU") called a "secondary terminal" is set forth. In such a system, adjacent stations or nodes in the communication route communicate with one another and, in the preferred embodiment of the invention, exchange signals indicating the degree of compression that node or station may implement. A control protocol and logical process is invoked at each node to select the maximum degree of mutually supportable compression to be implemented by the communicating adjacent stations with one another. The logical operations satisfy the goal of avoiding undesirable compression and decompression (such as multiple compression and decompression over intervening links, reduction of compression over one or more links followed by a return to increased compression) and other time consuming, and therefore costly, operations. Each node or station implements sufficient registers, decision logic (such as a processor) and/or comparison and control gating means to receive incoming indicators from adjacent communicating nodes or stations, to compare their indicated compression capabilities with its own (or others), and to reach logical conclusions as to what mode of compression should be adopted with and/or communicated to other adjacent communicating nodes to establish a uniform degree of compression over a link defined by two or more such nodes. In the preferred embodiment it is assumed that messages are exchanged between nodes or stations utilizing some common communication messaging protocol and architecture such as IBM's standard, frame-formatted communications practiced over Systems Network Architected (SNA) communications systems, as an example.

BRIEF DESCRIPTION OF DRAWINGS

FIG. 5 illustrates examples of typical SNA formatted messages, with one message including the headers, compression capability indicator and pointer of the preferred embodiment showing the type of compression that has been employed on a given data message.

DESCRIPTION OF PREFERRED EMBODIMENT

Figure 1:
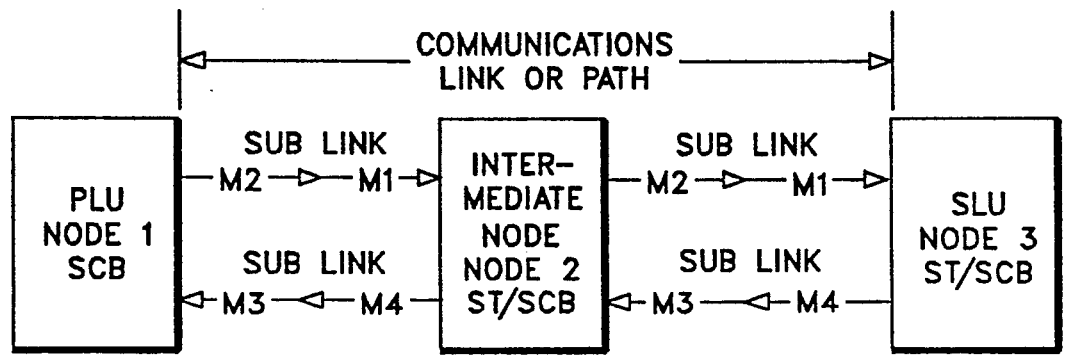
FIG. 1 schematically illustrates a data communications network link comprised of a plurality of communicating nodes or stations interconnected by sublinks between adjacent nodes or stations with the upstream and downstream nodes exchanging data compression capability messages.

Each node or station is capable of being an initiating node for commencement of a communication intended for another "target" node or station. These two nodes so designated are termed the "primary node" and the "secondary node" or, alternatively, the "communication link terminal nodes". Intervening nodes, if any, are simply communication link nodes. Since each node may have a different data compression capability, and the different compression capabilities range in power from a high degree to relatively low degree, or even none, it is desirable in the preferred embodiment to communicate among the nodes prior to the beginning of a full data communication. This is done in order to establish, for a given data communication session, the highest degree of mutually supportable data compression and decompression over the maximum capable portion of the communication path. Sublinks existing between intervening nodes between the primary and secondary stations will also be required to negotiate a non-conflicting degree of compression and decompression which is not either duplicative of the data compression (or decompression) to be conducted by the link terminal stations or of lower compression than that which will be carried out by the link terminal nodes or stations.

Briefly, the degree of compression to be implemented for a given communication session is negotiated amongst the communicating nodes involved in the session path by having the initiating "upstream" link terminal (or PLU) that desires to begin transmission to a target "downstream" link terminal node (or SLU) initiate a message containing an indicator of the PLU's highest data compression capability. This, in turn, is received by the next "downstream" communication station or node in the network over the route which is to be followed for a given communication. At such a station, the incoming indication of the existing "upstream" compression capability is compared with the receiving station's own compression capability. Following this, an indication is sent downstream to the next adjacent communication node or station indicating the greater of either the receiving node's communication compression capability or that which it received from upstream. This process is continued throughout the network until the indicator message finally reaches the destination target terminal or "link terminal node". At the terminal node, a return message is generated by that station indicating the lesser communication compression capability of either that which it received from upstream or that which it possesses as its own highest capability. This message is transmitted upstream toward the initiating link terminal. This message upstream is compared at any intervening nodes with the indication that the intervening node received from upstream. The most effective, supportable communication capability indicated from the two messages received at the intervening node, in comparison with each other and the node's own capability as determined by logical rules is then propagated upstream to the next intervening terminal, if any, and so on until the return message finally reaches the initiating link terminal. During this process, each terminal station is able to determine what degree of compression it should utilize with its neighbors for the maximum degree of compression that may be obtained over the entire or the longest part of the path between the two link terminal nodes. Each station is thus enabled to set its mode of data compression to be used with each of its neighbors. Other decisions by intervening nodes, such as not to engage in data compression or decompression but merely transmit received data directly through to the next station downstream, are also made on the basis of the information exchanged.

Turning now to the topic of data compression, a general description of data compression techniques and their relative degree of data compression is given. A variety of communications-oriented data compression techniques exist as has been noted above. For example, a given station may have no data compression or decompression capability, i.e. none or "raw data" compression may be implemented by this station. The next highest, or least degree of compression that is normally implementable, is the so-called "String Control Byte" or SCB. In this technique, series or runs of repeated characters are identified and sent "compressed" as the character itself plus a count of the number of times which the character itself is to be repeated. The next highest degree of compression utilizes SCBs and a typical Lempel-Ziv algorithm. Such algorithms are fully defined by the above-noted references. One with a small compression table or dictionary, for example in the range of 2,000 bytes of table size would be the least to be used with the SCB. This has a much higher degree of compression capability than an SCB alone, but may also accommodate the string control byte compression only. A still higher degree of compression may be obtained with a string control byte technique combined with a Lempel-Ziv algorithm utilizing a large dictionary or table, such as one on the order of 8,000 bytes.

In general, the details of the algorithms for data compression are not a part of this invention. It is only necessary to understand that whatever compression algorithm is employed by a given station or node may be indicated to other nodes by a message containing a hierarchical compression value based upon the degree of compression of which the node is capable. Also, generally speaking, if various compression capabilities are to be implemented in a given network among the various stations or nodes, it is most desirable if the compression algorithms are upwardly compatible. This means that a more capable data compression decompression node is still capable of handling the relatively lower degree of compression from some adjacent node or terminal but not vice versa.

Secondly, the exact method of communication, i.e. format and/or data communication protocol between nodes or stations is not a portion of the present invention. Any generally available and understood communications process, protocol or technique may be employed. For purposes of example only, the invention will be described with reference to a typical IBM SNA communication control technique and system, but any communicating system could equally well support the implementation of this invention. Generally, each node or station is defined by the type of compression capability which it supports. During an SNA network communication, a "session" is established for a given station or node that represents one terminus of a link. The session specifies that a given node wishes to communicate with a target node or station. The "target" represents the other terminus of a link. Messages are exchanged in accordance with a well-documented mechanism for so doing as discussed in "System Network Architecture Technical Overview", IBM #GC30-3073 and in "IBM Synchronous Data Link Control Concepts", IBM #GA27-3093 which shows how one initiates a session between the two thus-defined link terminal nodes.

It is evident that link terminal nodes may comprise any node in a network as the "initiator" and any other node as the "target". The communication link definition will thus have dynamic terminal points, depending upon the given session which has been established. In general, as described herein and in the two references just mentioned, for the preferred embodiment, SNA nodes or stations exchange session "requests" and "response messages" utilizing a well-known and highly documented frame format, the content of which identifies the sender or initiating node and targeted receiver node by address.

In the preferred embodiment, the degree of compression to be utilized for a given session is negotiated at the establishment of the session between the two logical units or nodes and that will be the link terminal nodes and any intervening or sub-link nodes. The session path, i.e. the route over the communication network that be followed, may vary, even for communication sessions having the same termini. The path may differ even from one session to the next between the same terminal and the scope of compression may also differ. Further, the node capability for compressing or decompressing may change at a new session. Thus, in general, it is necessary to have a compression negotiation sequence at the establishment of each session and also at any time when a given node changes its compression capability during a session. The compression negotiation phase at bind time in an SNA communications environment is necessary to establish the duration or time span that a given compression will be employed between appropriate nodes on the path existing between the link termini. The outcome of a bind negotiation that might typically exist is shown in FIG. 1.

In FIG. 1, node or station 1 is designated, in accordance with SNA architectural principles, as the primary logical unit, or PLU. This is the initiator of a given session and would ordinarily be understood to be a terminal desiring to send a data message to a given target or node which would be the secondary logical unit, SLU, representing, for the purposes of this session definition, the other link terminal node. A communications link will thus exist over a pathway existing from node 1, the PLU, to node 3, the SLU, and encompassing, perhaps, intervening or intermediate nodes 2 such as shown in FIG. 1. Each node will have its own inherent or native data compression capability depending upon the type of node or station that it is and how it has been configured. The example given in FIG. 1 is arbitrary and assumes that link terminal 1 has SCB compression capability while that at node 2 is assumed to possess a short table or small table Lempel-Ziv compression algorithm capability which also encompasses the ability to handle SCB compression. This is indicated by the abbreviation ST/SCB within the box representing node 2. The secondary logical unit, SLU3, is presumed to have a small table Lempel-Ziv capability which is also compatible with SCB capability. In this example, the hierarchy of capabilities present ranges from SCB capability to a Lempel-Ziv small table algorithm capability represented by nodes 2 and 3. A still higher degree of compression could be obtained by a Lempel-Ziv large table, abbreviated LT, or lower capability such as "none". These are not shown in FIG. 1, however, because they have not been assumed to occur for this example.

Thus, for purposes of the preferred embodiment shown, the compression capabilities could range from zero, or no capability upwards to SCB (string control byte) capability, to string control byte with small table Lempel-Ziv algorithmic capability (abbreviated ST) which includes SCB capability, and, finally, to large table Lempel-Ziv algorithm compression capability (abbreviated as LT) which is deemed to be capable of handling both small table Lempel-Ziv algorithm (ST) and SCB compression as well. Stated simply, the hierarchy of compression capabilities covers a range from "none" to a very high degree of compression (LT) with each next higher compression capability being capable of handling at least those of lesser capability which it exceeds.

Sublinks, for the overall route or path represented from the link termini PLU1 and SLU3 in FIG. 1, exist between stations 1 and 2 and 2 and 3, 3 and 2 and 2 and 1, each sublink comprising two nodes. Various degrees of compression may be practiced by communicating pairs of nodes as is evident. For example, node 1 could communicate using SCB compression to node 2 which, due to its higher capability, is capable of handling compressed communications from PLU node 1 or SLU node 3. Thus, node 2 has a higher capability of compression that it may utilize with node 3 which has the capability to accept data so compressed from node 2. If another intervening node (not shown) having no compression capability were present, it could not decipher compressed data from either of its neighbors; however, such a node need not participate in the communication data compression. It may merely transmit any compressed data without acting upon it when it is not intended to be the receiver link terminal or target.

While all of the foregoing assumptions for a given example may exist, it is apparent that some method must be provided for coordinating what compression routines will be implemented from among the capabilities exhibited by a given node or station in the network for a given session of data communication. This is accomplished in the preferred embodiment by exchanging messages at the session negotiation "bind time", using the terminology of the SNA data communications technique.

At the outset, it is assumed that link terminal node 1 of FIG. 1 which is to initiate a communication session with the target link terminal node 3. These nodes are designated in SNA parlance as the "primary logical unit" (PLU) and the "secondary logical unit" (SLU) between whom requests for session initiation and responses flow. Intervening node 2 is not a link terminal nodes since the link being established is between node 1 and node 3. Node 2 is, however, an intervening or intermediate node that may participate in data compression or decompression if that is advantageous.

A message is initiated by link terminal node 1 in a format such as that shown in FIG. 5 for SNA message communication with a compression indicator capable of showing compression capabilities from 0 to 3, with a "1" indicating that it has the capability, for example as shown in FIG. 1, to conduct SCB compression as its highest degree of capability. Message M2 is thus transmitted from node 1 downstream, or in a "first" direction, to the next adjacent node. The message M2 will be addressed, of course, to the intended target node 3, but it will be received enroute as message M1 by the intervening node 2 where the compression control indicator in the SNA header of FIG. 5 will be observed and compared with the capability for compression which is supported by node 2.

Figure 2:
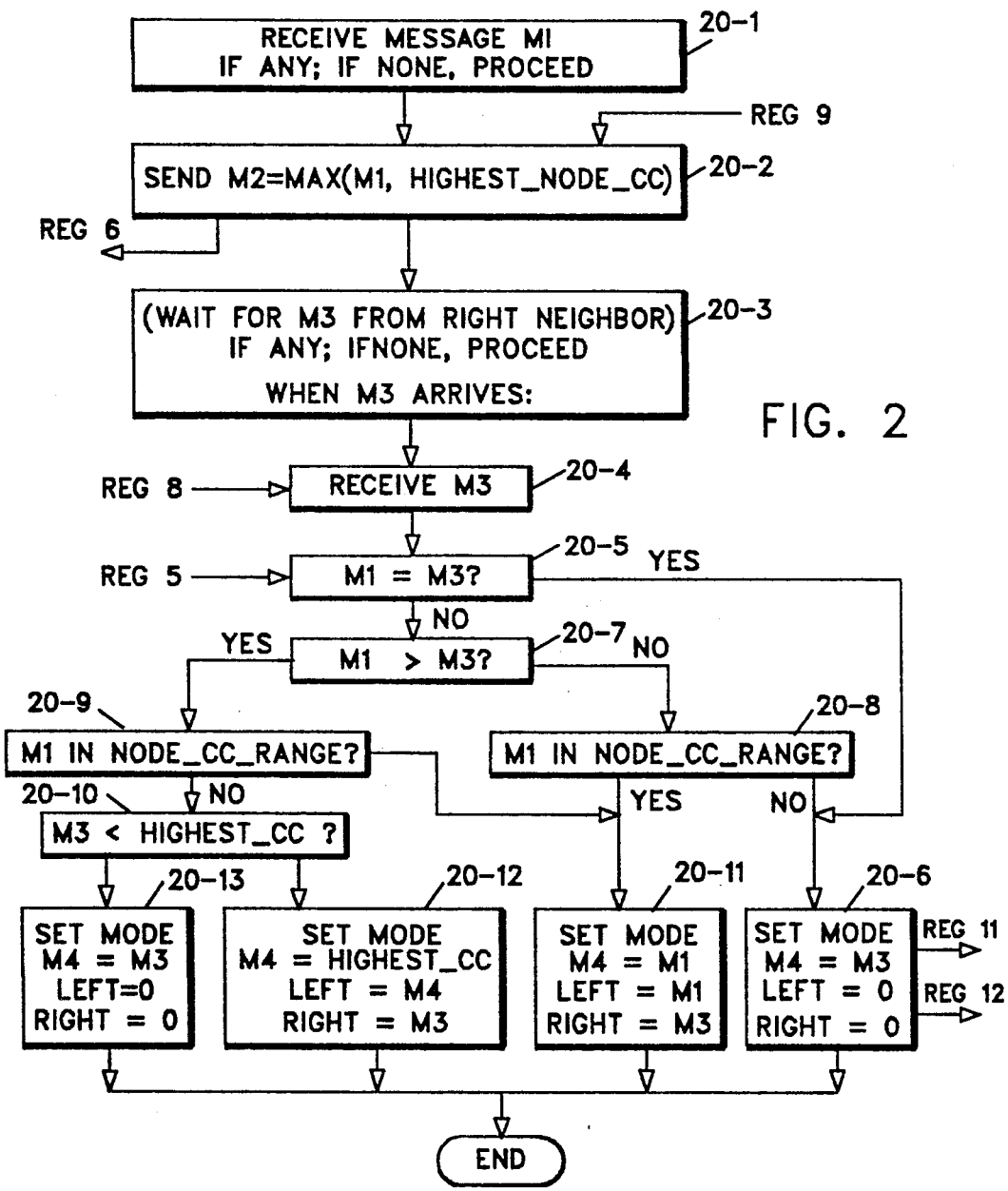
FIG. 2 illustrates a typical node's processing and decision logic for receiving and comparing data compression capabilities with its own data compression capabilities, if any, and for sending messages indicating capability and controlling the setting of its up and downstream modes of operation.

As shown in FIG. 2, a message M2 will be generated and sent by each node such as by node 2 downstream as a new "M2" message toward the target node 3. The message M2 will contain an indicator for the greatest degree of compression represented either by that capability exhibited by node 2 or that which it received in the "M1" message sent as "M2" from the link terminal node 1. In other words, the highest degree of compression capability is communicated to the next adjacent downstream station by each station involved in the overall link between node 1 and node 3 in this example.

At the link terminal node 3, the destination for the message initiated by link terminal node 1, the comparison is also made between the capability indicated as the highest degree supportable over the link between node 1 and node 3 and the capability of compression implemented at node 3. A return message M4 is generated and sent back upstream where it is received as M3 at node 2. M3 designates the upstream direction or a "second" direction opposite to that in which the initiation messages were propagated. M3 and M4 are thus, "response" messages. M3 contains an indicator for the compression capability which is the lesser of node 3's own capability or that which it received from the upstream direction. This process propagates back upstream to node 2 where a comparison is made between the compression degree indicator received from node 3 and that received from the upstream partner for node 2. Also a comparison is made against node 2's own degree of compression capability so that the new message M4 propagated from node 2 to node 1 in the upstream direction contains an indicator for the maximum supportable degree of compression capability as extracted logically by rules which will be described later from the messages received from upstream at node 2 or the message received from downstream at node 2 in comparison with each other and with node 2's capability. This process continues through all intervening nodes (if any) until finally, the link terminal node 1 receives a message M4 from downstream indicating the degree of compression capability which the link from node 1 downstream is capable of supporting.

As just stated, at each node, additional comparisons are made between the node's own degree of compression capability and the capabilities indicated in the M1 and M3 messages received from upstream and downstream (respectively) in order to allow the node to adopt a mode of compression, decompression (or none at all) as is consistent with desired rules of operation. For example, returning to the example shown in FIG. 1, node 2 is capable of handling communications from node 1 in the maximum degree of compression that node 1 is capable of supporting. In the process described above, node 1 will send an indicator showing a capability of "SCB" compression which will be received in message M1 by node 2. Node 2 has small table Lempel-Ziv compression capability (ST) and will indicate that capability via a new message M2 sent downstream to node 3. Node 3 is a link terminal and thus will not propagate messages further downstream in this session. Node 3 will compare its capability with the indication received as message M1 from upstream. In this case, node 3 also has ST capability. The rule of comparison is that node terminal link 3 should send the lower capability of either its own or that which it received. In this case, the capabilities are equal, so an indicating message is sent back upstream indicating ST capability. At node 2, which also has ST compression capability, the message is compared to the capability received from its upstream partner, namely node 1, which indicated SCB capability. The lesser capability of that which was received from downstream and that which was received from upstream is transmitted back upstream to node 1. In this case, node 1 will receive an indication that SCB compression may be supported over the link to its neighbor node 2 downstream.

Node 1 will set its mode control logic to compress and decompress utilizing SCB compression on all transmissions and receptions which it receives from or transmits to the link. Node 2 will set its mode of operation for "M1" reception from the upstream node, node 1, to SCB compression decoding or decompression, but will set its mode of communication "M2" with the downstream node or nodes as ST compression since it has learned that ST compression can be supported over the link between it and the target node 3. If another intervening node (not shown) were to exist having no compression capability, it would, nevertheless, have compared its capability against that received from upstream and from downstream and would have adopted a mode of raw or "no" compression or decompression, i.e. "straight transmission" for communications destined through it. In general, a node should not participate in any compression or decompression unless some advantageous result such as a higher degree of compression over a sublink (such as between node 2 and node 3 or node 3 and node 2) might be obtained. Node 3, having received from upstream a message "M1" indicating that ST compression capability exists over its receiving side link, adopts a mode for decompression and compression of ST rather than the lesser degree of compression of which it is capable, i.e. SCB compression.

Thus, in this example, a higher degree of compression and decompression is practiced over the sublink between nodes 2 and 3 than that which is practiced over the sublink between nodes 1 and 2. Nevertheless, the highest degree of compression over the entire link between node 1 and node 3 has been obtained since the highest degree of compression over each of the participating sublinks will have been achieved.

With regard to the direction of propagation of messages, i.e. "downstream" or "upstream", it should be understood that these are arbitrary and relative terms. The transmission from an initiating primary logical unit such as PLU 1 in FIG. 1 is shown to be toward the right (or "downstream") in this example but it might just as easily have been shown toward the left and that could have been termed a "downstream" direction or even an upstream direction. What is important is that the logical comparisons made with the messages received and the capabilities present at each node be made as described with the comparisons indicating the greater capability in the outbound initiation message transmitting sequence and the maximum supportable (i.e. matched upstream) capability of that represented at each node between what it received from upstream and that which it received from downstream (if any) being used in the return or response sequence.

Additional rules to prevent initiation of unproductive compression and decompression should also be implemented as will be discussed later. For example, there exists a special case where the intermediate network node or nodes have a lower degree of compression capability than the link terminal nodes. In such a case, the intermediate nodes should drop out of doing any compression or decompression since the left and right partners of such nodes can handle one another's compression and decompression without the help or aid of the intermediate node. Another special case exists where the intermediate nodes on both sides of a given intermediate network node have an equal compression capability. In this case the intervening node should adopt no compression even if it has a greater capability since its greater capability cannot be supported over the sublinks between it and its adjacent partners.

Figure 3:
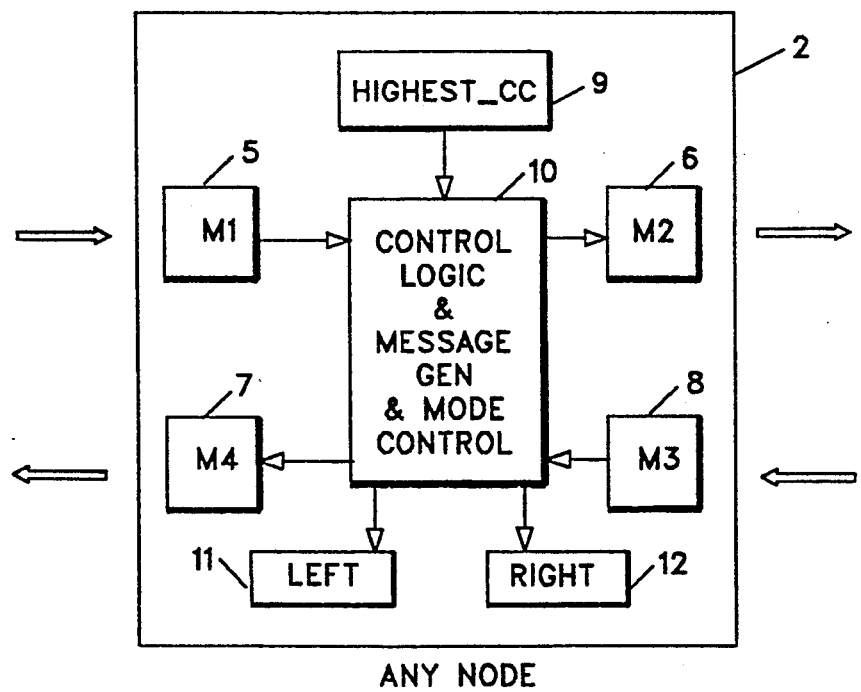
FIG. 3 illustrates a typical node's physical logic requirements in a schematic fashion.

Turning to FIG. 3, each node must include, at a minimum, a register for storing a compression capability indicator pertinent to that node's inherent highest capability and other registers to store the indicators which it may receive from upstream or downstream partners. A comparator circuit and a mode control circuit are also required as is evident from the foregoing discussion. All of these elements are shown schematically in FIG. 3 and in more detail in FIG. 4 as noted above. Turning to FIG. 3, the overall node logical elements for compression capability indication and indication message generation are shown as follows.

In FIG. 3, message and mode control registers as well as the node's own compression capability register together with control logic are shown schematically. It may be noted at the outset that a generic node is shown and that if the node were a link terminal node then either the registers M1 and M4 or M2 and M3 would not be necessary since further communication upstream or downstream might not be required if the node is a terminal node. Thus, the node is shown as node 2 and is a generic intermediate or terminal node for purposes of discussion. As has been briefly alluded to above in the discussion, each node has a receiving register such as register 5 where it receives messages from a direction arbitrarily designated as "upstream". This message is used by the node 2 as its message M1. As has been alluded to earlier, M1 is the received message sent as M2 by the next upstream node to the present node. M2 is thus the downstream propagated message from any node and is shown for node 2 as contained in a register for M2 designated register 6. Similarly, upstream received messages are sent by any node as messages M4 from a register 7 and upstream bound messages are received incoming as messages M3 and stored in a register 8. The mode's own degree of compression capability is stored in a register 9 and control logic 10 interfaces to all of the registers 5 through 9 as well as the mode control registers 11 and 12 which indicate the degree of compression or decompression to be employed with messages received from left or right, i.e. upstream or downstream partners. The control logic includes message generation and mode control mechanisms that most appropriately are implemented in a program process to be performed by a microprocessor or the like, but which may be equally well implemented in program logic arrays or hard logic. The control logic 10 is only schematically indicated in FIG. 3 as details of implementation will be apparent from the process flows which will be given later and the more detailed schematic implementation to be given.

It may be noted that messages received at a node as coming from upstream are designated M1 but they are sent by the upstream node as a downstream message M2. Similarly, upstream messages are sent as messages M4 and are received at a receiver node as incoming upstream messages M3. The M designations are arbitrary and are used for convenience in generating the logical tables for selecting the mode control and for determining what message should be generated and sent.

Figure 4:
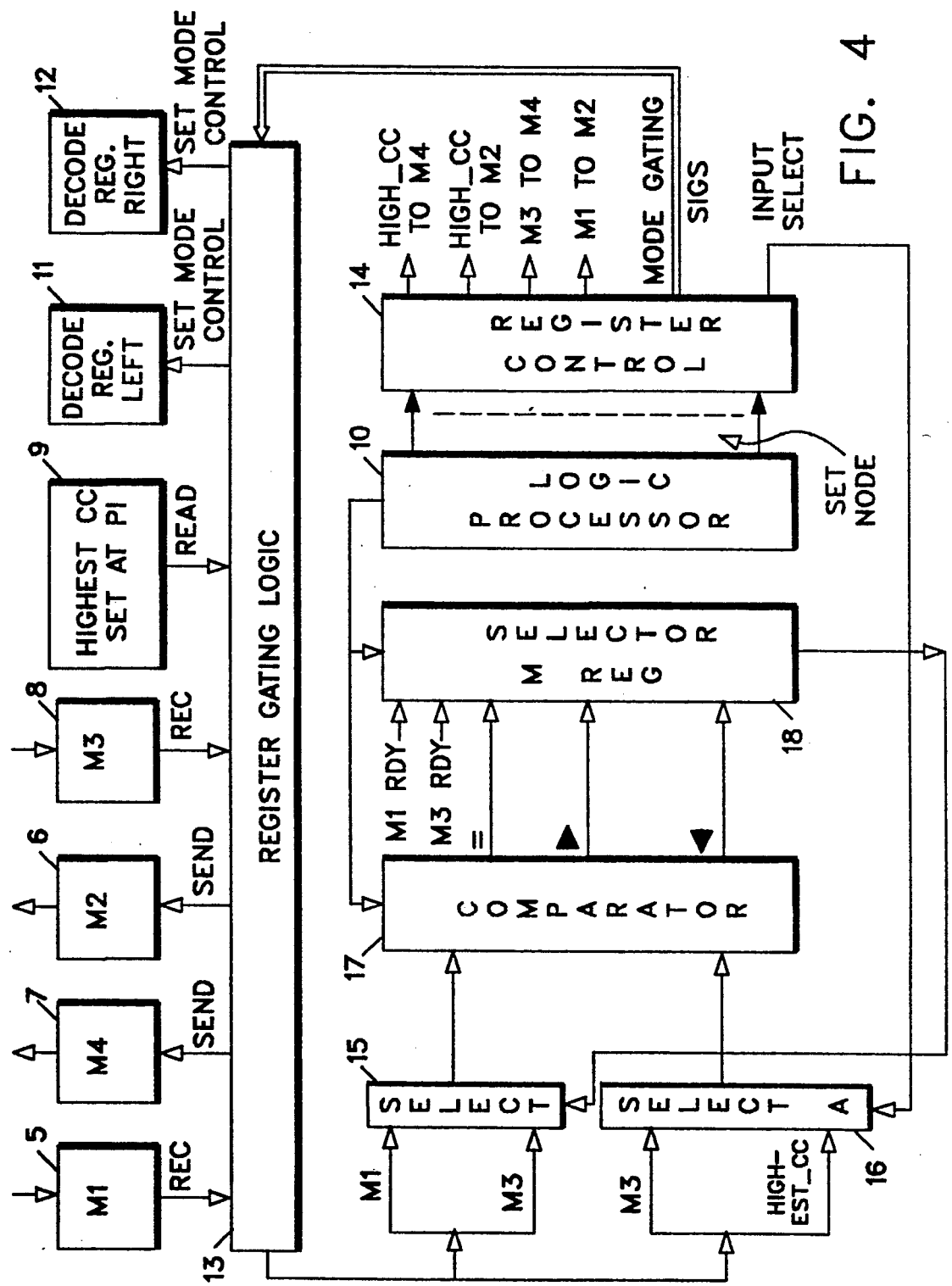
FIG. 4 illustrates in greater detail the specific logic necessary at each node for making the data communication capability comparisons and compression mode adoption control decisions.

Turning to FIG. 4 the detailed logic elements for any node as implemented in the preferred embodiment are shown in a representative example.

In FIG. 4, the detailed logic contained in each node for doing the compression capability comparisons and controlling the mode setting operation and for generating the messages M2 or M4 to be communicated upstream and downstream are shown as follows:

The registers 5 through 12 from FIG. 3 are shown at the top of FIG. 4. Register gating logic 13 under control of the processor logic 10 and control register 14 are shown. Incoming messages M1 and M3 are shown by arrows directed to the registers 5 and 8 while outbound messages are shown by the arrows directed outward from registers 7 and 6. The gating logic 13 is controlled by gating signals from control register 14 as set by mode selection logic from the processor 10 to control gating of the contents of register 9 into register 7 or the contents of register 8 into register 7 after logical comparisons have been made. Also the content of register 9 may be gated to outbound M2 register 6 or the incoming content from register M5 may be gated to the outbound register 6 depending upon logical comparisons performed by the processor 10. Control register 14 also supplies mode control gating signals to the left and right mode control registers 11 and 12 respectively. The possible settings for the mode control registers 11 and 12 include 0 for no compression, 1 for SCB compression, 2 for small table Lempel-Ziv and 3 for large table Lempel-Ziv in this example. Logic also controls whether the values 0 through 3 loaded into the registers 11 and 12 come from the values represented in M1 or M3 or from the node's own register 9 for both the left and right mode control registers 11 and 12 in accordance with logical rules of decision that will be discussed in greater detail later.

The control register 14 also provides gating selection signals to the selectors 15 and 16 to select input from register gating logic 13 as either M1 or M3 into selector 15 or M3 or the highest compression capability value into selector 16. The outputs of the selectors 15 and 16 are controlled into the comparator 17 by control signals from the processor logic 10 where comparisons are made between M1, M3 and the highest node compression capability value which the node has. The output of the comparator 17 indicates whether the comparison between the selected inputs finds them equal to each other, one greater than the other or one less than the other as indicated by the three output lines from comparator 17 to the mode register selector 18. Mode register selector 18 supplies the selection signals under control of the logic unit 10 as shown by the control line connecting the mode register selector 18 with the input selector gates 15 and 16. The results of the chosen comparison of inputs is provided to the logic or processor unit 10 from the selector 18. In processor 10 the logical sequence of choices is made depending upon rules that will be described and a final mode selection and control setting signals are fed to the control register 14 and to the mode in gating controls as shown.

The control processor 10 may operate a controlling program to enable it to perform the compression negotiation routine and mode setting functions. Simple logical tests are performed and then, based upon the outcome, the processor controls the gating of appropriate signals to the input or output registers and control registers. The small signals shown as "M1RDY" and "M3RDY" as inputs to the register selector 18 indicate that message M1 or M3 has arrived at the inputs and is ready for selection and comparison. The processor 10 first selects M1 inputs for comparison and then M3, awaiting the actual receipt of the messages prior to processing their contents. The processor will reset the selections once M3 and M1 registers have been gated to the selections determined by the processor and set into the control register 14.

Turning now to FIG. 2, an overall flowchart of the processes and logical requirements of generating the downstream message M2 and the upstream message M4 as well as setting the mode control registers is described in detail. The process begins in box 20-1 upon the receipt of an incoming M2 message from upstream at a given node. This will be received and is indicated as the receive message "M1". A comparison is performed between the incoming M1 and the node's own highest compression capability from register 9 as shown in box 20-2 and, as also shown in box 20-2, the downstream message M2 is generated, set into the M2 register 6 and sent as M2 downstream. The rule of generation employed in the comparison is that M2 will represent the highest capability represented either by the receive message M1 or that possessed by the node in its register 9. The message M2 will be a message such as shown in FIG. 5 in which the SNA compression header has a capability indicator set to a value in the range of from 0 to 3 in the present example. As presently assumed, the range of compression capabilities ranges from none which is indicated by a 0 to a high of 3 for a large table Limpel-Ziv compression algorithm, but it will be understood that such a designation is arbitrary and is illustrative only of the preferred embodiment.

Returning to the flow in FIG. 2, the processor enters a wait mode after sending message M2 when it waits for the arrival of message M3 from its right or downstream neighbor as shown in box 20-3. M3 is received and stored in a message register 8. If no message M3 is received or if, indeed, there is no right neighbor and the present node is the terminal link node, the flow proceeds with the assumption that message M3 was received with a value the same as M2 and the further processing tests are performed. Box 20-4 shows the receipt in register 8 of the upstream message M3 from the downstream or right neighbor. A comparison is made is box 20-5 between the incoming upstream message M1 and that received downstream to determine if they are equal and if the answer is "yes", the flow continues as shown to box 20-6 where message M4 is generated with a value equal to that found in message M3 and is propagated upstream while the modes of operation are set into register 11 and 12 with a value of 0, i.e. no compression or decompression to be conducted in this instance.

If the test in box 20-5 indicates that M1 and M3 do not contain equal values, the flow proceeds to box 20-7 where the comparison question is asked whether M1 is greater than M3. Depending upon the result, one of the output legs to box-8 or 20-9 is taken where further comparisons are conducted as shown which will lead either to additional comparison in 20-10 or the setting of the mode and message control registers in boxes 20-11, 12 or 13 as indicated by the flow arrows.

All of the logical controls to be set based upon the upstream and downstream compression capability indications received, if any, may be summarized as follows:

Case A: If the upstream compression capability indicated to a node equals the downstream compression capability indicated at the same node or if the upstream compression capability does not equal the downstream capability and the node's own compression capability is less than both the upstream compression capability indicated and the downstream compression capability indicated, or if the upstream compression capability is not equal to the downstream compression capability indicated and the node's own compression capability is less than or equal to the upstream and downstream compression capabilities, then the mode control for which this node will operate in the upstream and downstream directions is set equal to 0 in both registers 11 and 12 of FIGS. 3 and 4.

Case B: If the downstream indicated compression capability at a node is less than the indicated upstream compression capability and the node's own compression capability and if the node's own compression capability is greater than or equal to the upstream capability or if the upstream capability is less than the downstream indicated compression capability at the node and the node's own compression capability, set the node compression capability control upstream register 11 to the indicated upstream node's compression capability and the downstream control register indication to the indicated downstream node's compression capability.

Case C: If the indicated downstream compression capability at a node is less than the indicated upstream compression capability and the node's own compression capability and if the node's own compression capability is less than the upstream compression capability, set the upstream compression mode to be equal to the node's own capability and the downstream mode control register equal to the downstream node's indicated compression capability.

Case D: If the indicated upstream compression capability is less than the node's own compression capability and the indicated downstream compression capability, set the upstream node control mode register with a value equal to the indicated upstream node's compression capability and the downstream compression capability equal to the node's own capability.

Case E: When there is no downstream node: if the upstream indicated capability is equal to or less than the receiving node's own capability, set the upstream mode equal to the indicated upstream node's capability but if the upstream node's capability is greater than the receiving node's capability, set the upstream mode equal to the node's own capability.

An exhaustive study of all the permutations possible indicates that any other logically possible permutations result in impossibility; therefore, the foregoing rules cover all logical potentials for any indicated degrees of compression capability from upstream and downstream, if any, at a given node in comparison with the node's own capability.

It may be noted at this point, that the discussion given is a generic one in that the tests to be performed are the same tests to be performed regardless of whether the node is an intermediate node or is a terminal node. The only distinction being that there will actually be no received M1 or generated M4 messages if a initiating terminal node is involved and there will be no received M3 or generated M2 messages if it is a target or link terminal node. In order to accommodate the logic, any node failing to receive a message M3 will substitute in the comparison against its own capability the value which it would have generated for sending downstream, i.e. it loops the incoming message M1 to the M3 input in a logically equivalent manner.

As is evident from the foregoing discussion, the specific communication technique practiced over the network of nodes is not a limiting or pertinent factor in the present invention. The invention concerns itself with the overall system of data communication utilizing the highest degree of supportable compression and with methods for negotiating what that degree of compression should be over each link and sublink.

An improved communication apparatus for each node and an improved system having the capability of utilizing the greatest degree of compression which it is capable of supporting over each given link has thus been shown. It will be evident that numerous kinds of data compression techniques might be employed and that some higher compression techniques might not be compatible with lower degrees of compression. This is the normal case that results when a given node or station has no compression capability. This will force its neighbors, or any node desiring to communicate with it as a link terminal node, to adopt the capability which the receiving intended target node can handle, namely no compression at all. Nevertheless, if links are initiated between nodes that can each mutually support a higher degree of compression and decompression, that may be decided upon during the compression negotiation communication phase as practiced by this invention. Such higher compression will then be adopted for the given session between such nodes. Moreover, if nodes having a higher degree of capability are sublinks in an overall link between a target and an initiating node, they may nevertheless participate in their own inherently higher capability with one another, provided only that they are capable of supporting lesser degrees of compression with neighbors.

In carrying out the invention, it may thus be seen that the most desirable network compression techniques employed will be those which are at least "upwardly compatible". This is meant to state that each station having a higher degree of compression capability should nevertheless, i.e. capable of handling communications at a lower degree of compression capability. Such hierarchically related compression capabilities have been demonstrated in the preferred embodiment, but numerous other selections of compression capability are capable of achieving the same hierarchical compatibility as will be apparent to those of skill in the art.

Therefore, what is set forth in the claims which follow and which is desired to be protected by this application, is set forth by way of description only and not of limitation in which, what is claimed is:

1. At each node of a data communications network having plural interconnected nodes for sending and receiving data, any two of which nodes may define link terminal ends for the purposes of a given communication, each said node having an identifiable degree of data compression capability and settable modes of data compression operation less than or equal to said identifiable compression capability, a method of controlling the degree of data compression and data decompression applied by said node to transmitted or received data over a link whose ends are defined in said network by any two of said nodes, comprising steps performed at each said node in said link of:

generating indications at said node of the maximum degree of data compression capability supportable with any neighboring nodes to said node in first and second directions from said node; and controlling said node's data compression operation in said first and second directions from said node in accordance with said indications of the maximum degree of data compression capability supportable with said neighboring nodes; and sending said indications to any said neighboring nodes lying in said first and second directions, respectively, from said node to which said indications pertain; and receiving at said node indications of the maximum degree of data compression supportable at said node's neighboring nodes; and comparing said node's own degree of data compression capability with said received indications.

2. A method as claimed in 1, wherein:

if said indications of the maximum degree of data compression capability for said node and received at said node from said neighboring nodes are designated, respectively as Uc for indications received at said node from said first direction and Dc for indications received at said node from said second direction and Nc for the indications possessed by said node, said controlling step is responsive to said comparing step in accordance with the results of said comparisons as defined by the following relationships:

if Uc is equal to Dc, or if Uc is not equal to Dc and Nc is less than both Uc and Dc or if Uc is not equal to Dc and Nc is less than or equal to Uc and Dc, setting said node's mode of data compression operation in both said first and said second directions to none; and if Dc is less than Uc and Nc and if Nc is greater than or equal to Uc, or if Uc is less than Dc and Nc, setting node's mode of data compression operation in said second direction equal to Uc and setting said node's mode of data compression in said first direction equal to Dc; and if Dc is less than Uc and Nc and if Nc is less than Uc, setting node's mode of data compression operation in said second direction equal to Nc and setting said node's mode of data compression in said first direction equal to Dc; and if Uc is less than Nc and Dc, setting said node's mode of data compression in second direction equal to UC and setting node's mode of data compression operation in said first direction equal to Nc.

3. A method as claimed in claim 2, wherein, whenever said node lacks a said neighboring node in either said first or said second direction, setting said node's mode of data compression operation according to the following relation:
- if Uc is less than or equal to Nc or if Dc is less than or equal to Nc according to whichever of Uc or Dc is received, setting said node's mode of data compression equal to Uc or Dc in the direction to its said neighboring node which provided said Uc or Dc indication; and
- if Nc is less than Uc or Dc, according to whichever of said Uc or Dc indications is received, setting said node's mode of data compression operation equal to Nc with its existing said neighboring node providing said Uc or Dc indication.

4. At each node of a data communications network having plural interconnected nodes for sending and receiving data, any two of which nodes may define link terminal ends for purposes of a given communication, each said node having an identifiable degree of data compression capability and settable modes of data compression operation less than or equal to said identifiable compression capability, means for controlling the degree of data compression and data decompression applied by said node to transmitted or received data over a link whose ends are defined in said network by any two of said nodes, comprising:
- means at said node for generating indications of the maximum degree of data compression capability supportable by said node with any neighboring said nodes in first and second directions from said node; and
- means for controlling said node's data compression operation in said first and second directions from said node in accordance with said indications of the maximum degree of data compression capability supportable by said node with said neighboring nodes;
- means for sending said indications to any said neighboring nodes lying in said first and said second directions, respectively, from said node to which said indications pertain; and
- means for receiving indications at said node of the maximum degree of data compression capability supportable at said node's neighboring nodes; and
- means for comparing said node's own degree of data compression capability with said received indications.

5. In a node as claimed 4, apparatus further comprising:
- means for controlling the setting of said node's modes of data compression operation in response to said comparing means in accordance with the results of said comparisons as defined by the following relationships:
- if Uc is equal to Dc, or if Uc is not equal to Dc and Nc is less than both Uc and Dc or if Uc is not equal to Dc and Nc is less than or equal to Uc and Dc, setting said node's mode of data compression operation in both said first and said second directions to none; and
- if Dc is less than Uc and Nc and if Nc is greater than or equal to Uc, or if Uc is less than Dc and Nc, setting node's mode of data compression operation in second direction equal to Uc and setting said node's mode of data compression in said first direction equal to Dc; and
- if Dc is less than Uc and Nc and if Nc is less than Uc, setting node's mode of data compression operation in said second direction equal to Nc and setting said node's mode of data compression in said first direction equal to Dc; and
- if Uc is less than Nc and Dc, setting said node's mode of data compression in second direction equal to UC and setting node's mode of data compression operation in said first direction equal to Nc.

6. In a node as claimed in claim 5, wherein, if said node lacks a said neighbor in either said first or said second direction, means for controlling said setting of said modes of data compression with an existing said neighbor comprising means responsive to said comparing means according to the following relation:
- if Uc is less than or equal to Nc or if Dc is less than or equal to Nc according to whichever of Uc or Dc is received, setting said node's mode of data compression equal to Uc or Dc in the direction to its said neighboring node which provided said Uc or Dc indication; and
- if Nc is less than Uc or Dc, according to whichever of said Uc or Dc indications is received, setting said node's mode of data compression operation equal to Nc with its existing said neighboring node providing said Uc or Dc indication.

7. A method of operating a data communications network having plural interconnected nodes for sending and receiving data, any two of which said nodes may define link terminal ends for purposes of a given communication, each said node having an identifiable degree of data compression capability and settable modes of data compression operation less than or equal to said identifiable data compression capability comprising steps performed at each node in said link of:
- generating at said node indications of the maximum degree of data compression capability supportable with any neighboring nodes to said node in first and second directions from said node; and
- controlling said node's data compression operation in said first and second directions from said node in accordance with said indications of the maximum degree of data compression supportable with said neighboring nodes; and
- sending said indications to any said neighboring nodes lying in said first and said second directions, respectively, from said node to which said indications pertain; and
- receiving indications at said node of the maximum degree of data compression supportable at any said node's neighboring nodes; and
- comparing said node's own degree of data compression capability with said received indications.

8. A method as claimed in claim 7, wherein said controlling step further comprises setting said node's modes of operation according to the following relations:
- if said indications of the maximum degree of data compression capability for said node and received at said node from said neighboring nodes are designated, respectively, as Uc for indications received at said node from said first direction and Dc for indications received at said node from said second direction and Nc for the indications possessed by said node, said controlling step is responsive to said comparing step in accordance with the results of said comparisons as defined by the following relationships:
- if Uc is equal to Dc, or if Uc is not equal to Dc and Nc is less than both Uc and Dc or if Uc is not equal to Dc and Nc is less than or equal to Uc and Dc, setting said node's mode of data compression operation in both said first and said second directions to none; and if Dc is less than Uc and Nc and if Nc is greater than or equal to Uc, or if Uc is less than Dc and Nc, setting node's mode of data compression operation in second direction equal to Uc and setting said node's mode of data compression in said first direction equal to Dc; and if Dc is less than Uc and Nc and if Nc is less than Uc, setting node's mode of data compression operation in said second direction equal to Nc and setting said node's mode of data compression in said first direction equal to Dc; and if Uc is less than Nc and Dc, setting said node's mode of data compression in second direction equal to UC and setting node's mode of data compression operation in said first direction equal to Nc.

9. A method as claimed in claim 8, wherein if said node lacks a said neighbor in either said first or said second direction, steps of setting said node's mode of data compression operation with its existing said neighbor comprising:

if Uc is less than or equal to Nc or if Dc is less than or equal to Nc according to whichever of Uc or Dc is received, setting said node's mode of data compression equal to Uc or Dc in the direction to its said neighboring node which provided said Uc or Dc indication; and if Nc is less than Uc or Dc, according to whichever of said Uc or Dc indications is received, setting said node's mode of data compression operation equal to Nc with its existing said neighboring node providing said Uc or Dc indication.

10. A data communications network comprising a plurality of nodes, each said node of said network having plural interconnected nodes for sending and receiving data, any two of which nodes may define link terminal ends for purposes of a given communication, each said node having an identifiable degree of data compression capability and settable modes of data compression operation less than or equal to said identifiable compression capability, means for controlling the degree of data compression and data decompression applied by said node to transmitted or received data over a link whose ends are defined in said network by any two of said nodes, comprising:

means at said node for generating indications of the maximum degree of data compression capability supportable by said node with any neighboring said nodes in first and second directions from said node; and means for controlling said node's data compression operation in said first and second directions from said node in accordance with said indications of the maximum degree of data compression capability supportable with said neighboring nodes; and means for sending said indications to any said neighboring nodes lying in said first and said second directions, respectively, from said node to which said indications pertain; and means for receiving indications at said node of the maximum degree of data compression capability supportable at said node's neighboring nodes; and means for comparing said node's own degree of data compression capability with said received indications.

11. In a node as claimed in claim 10, apparatus further comprising:

means for controlling the setting of said node's modes of data compression operation in response to said comparing means in accordance with the results of said comparisons as defined by the following relationships:

if Uc is equal to Dc, or if Uc is not equal to Dc and Nc is less than both Uc and Dc or if Uc is not equal to Dc and Nc is less than or equal to Uc and Dc, setting said node's mode of data compression operation in both said first and said second directions to none; and if Dc is less than Uc and Nc and if Nc is greater than or equal to Uc, or if Uc is less than Dc and Nc, setting node's mode of data compression operation in second direction equal to Uc and setting said node's mode of data compression in said first direction equal to Dc; and if Dc is less than Uc and Nc and if Nc is less than Uc, setting node's mode of data compression operation in said second direction equal to Nc and setting said node's mode of data compression in said first direction equal to Dc; and if Uc is less than Nc and Dc, setting said node's mode of data compression in second direction equal to UC and setting node's mode of data compression operation in said first direction equal to Nc.

12. In a node as claimed in claim 11, wherein, if said node lacks a said neighbor in either said first or said second direction, means for controlling said setting of said modes of data compression with an existing said neighbor comprising means responsive to said comparing means according to the following relation:

if Uc is less than or equal to Nc or if Dc is less than or equal to Nc according to whichever of Uc or Dc is received, setting said node's mode of data compression equal to Uc or Dc in the direction to its said neighboring node which provided said Uc or Dc indication; and if Nc is less than Uc or Dc, according to whichever of said Uc or Dc indications is received, setting said node's mode of data compression operation equal to Nc with its existing said neighboring node providing said Uc or Dc indication.

* * * * *